United States Patent
Geller et al.

(10) Patent No.: US 10,854,106 B2
(45) Date of Patent: Dec. 1, 2020

(54) TARGETED REPETITION AND TARGETED REINFORCEMENT IN A LANGUAGE LEARNING SYSTEM

(71) Applicants: Ofir Geller, Yavniel (IL); Micah Kosstrin-Greenberg, Stamford, CT (US)

(72) Inventors: Ofir Geller, Yavniel (IL); Micah Kosstrin-Greenberg, Stamford, CT (US)

( * ) Notice: Subject to any disclaimer, the term of this patent is extended or adjusted under 35 U.S.C. 154(b) by 1302 days.

(21) Appl. No.: 14/813,490

(22) Filed: Jul. 30, 2015

(65) Prior Publication Data

US 2016/0035249 A1 Feb. 4, 2016

Related U.S. Application Data

(60) Provisional application No. 62/031,127, filed on Jul. 30, 2014.

(51) Int. Cl.
*G09B 19/06* (2006.01)
*G09B 7/04* (2006.01)

(52) U.S. Cl.
CPC .............. *G09B 19/06* (2013.01); *G09B 7/04* (2013.01)

(58) Field of Classification Search
CPC .................................. G09B 7/04; G09B 19/06
See application file for complete search history.

(56) References Cited

U.S. PATENT DOCUMENTS

| | | | | |
|---|---|---|---|---|
| 5,820,386 A | * | 10/1998 | Sheppard, II | G09B 5/065 434/322 |
| 6,077,085 A | * | 6/2000 | Parry | G09B 19/06 434/322 |
| 2004/0029084 A1 | * | 2/2004 | Johnson | G09B 19/06 434/169 |
| 2004/0167770 A1 | * | 8/2004 | Zhuo | G06F 17/289 704/4 |

(Continued)

OTHER PUBLICATIONS

U.S. Appl. No. 12/133,031, filed Dec. 10, 2009, Keim.
U.S. Appl. No. 13/673,759, filed May 15, 2014, Edge.

*Primary Examiner* — Xuan M Thai
*Assistant Examiner* — Sadaruz Zaman
(74) *Attorney, Agent, or Firm* — Kelsey Stout Intellectual Property

(57) ABSTRACT

A computer-based language learning system uses targeted repetition to familiarize a student with words and language governing rules. Targeted repetition presents practice-sentences made up of specific words and rules the language learning system has targeted for practice, with the intervals between encounters of targeted words and rules varying based on prior incorrect, correct and partially correct responses to the rule-items. Targeted reinforcement determines manner of response to practice-sentences. Learning records for each word and rule track information used in calculating an up-to-the-moment 'need to practice' rating for the rule-item. Learning records also track each prior response to the item, allowing the language learning system to determine the aspects of the word or rule-item of which a student lacks mastery. The language learning system provides targeted reinforcement by drilling the student on the particular aspect of the rule needing practice, along with the practice-sentence incorporating it.

18 Claims, 9 Drawing Sheets

| No 201 | soy 202 | de 203 | Chile 204 | Rule: context word choice 205 | Rule: capitalisation 206 | Rule: word order 207 |
|---|---|---|---|---|---|---|
| Not 208 | I am 209 | from 210 | Chile 211 | - | - | - |
| correct word? 212 | correct word? 213 | correct word? 214 | correct word? 215 | 'soy' for country of origin 216 | country names capitalised 217 | neg. before verb 218 |
| spelling 219 | spelling 220 | spelling 221 | spelling 222 | 'estoy' for country of origin 223 | - | pronoun bf. obj. 224 |
| - | person 225 | - | - | - | - | - |
| - | - | - | - | - | - | - |
| - | tense 226 | - | - | - | - | - |
| audio match 227 | audio match 228 | audio match 229 | audio match 230 | - | - | - |

(56) References Cited

U.S. PATENT DOCUMENTS

| | | | |
|---|---|---|---|
| 2007/0015121 A1* | 1/2007 | Johnson | G09B 7/04 434/156 |
| 2009/0307203 A1* | 12/2009 | Keim | G06F 17/30699 |
| 2010/0003659 A1* | 1/2010 | Edmonds | G09B 19/06 434/350 |
| 2013/0041668 A1* | 2/2013 | Nakajima | G10L 13/00 704/260 |
| 2014/0308631 A1* | 10/2014 | Cohen | G09B 5/06 434/169 |
| 2017/0243502 A1* | 8/2017 | Loh | G09B 7/04 |
| 2018/0374378 A1* | 12/2018 | Thomas | G09B 7/04 |

* cited by examiner

| No 201 | soy 202 | de 203 | Chile 204 | Rule: 205 context word choice | Rule: capitalisation 206 | Rule: word order 207 |
|---|---|---|---|---|---|---|
| Not 208 | I am 209 | from 210 | Chile 211 | - | - | - |
| correct word? 212 | correct word? 213 | correct word? 214 | correct word? 215 | 'soy' for country of origin 216 | country names capitalised 217 | neg. before verb 218 |
| spelling 219 | spelling 220 | spelling 221 | spelling 222 | !'estoy' for country of origin 223 | - | pronoun bf. obj. 224 |
| - | person 225 | - | - | - | - | - |
| - | - | - | - | - | - | - |
| - | tense 226 | - | - | - | - | - |
| audio match 227 | audio match 228 | audio match 229 | audio match 230 | - | - | - |

Fig. 2

| rule-item# 301 | previous response #.1 316 | previous response #.2 317 | previous response #.3 318 |
|---|---|---|---|
| word 302 | correct word? 319 | correct word? | correct word? |
| going 303 | spelling 320 | spelling | spelling |
| voy 304 | person 321 | person | person |
| # times seen 305 | tense 322 | tense | tense |
| # times correct 306 | audio match 323 | audio match | audio match |
| timestamp last view 307 | timestamp this view 324 | timestamp this view | timestamp this view |
| ord. last view 308 | ordinal this response 325 | ordinal this response | ordinal this response |
| targeted priority 309 | - | - | - |
| difficulty 310 | - | - | - |
| importance 311 | - | - | - |
| ease of incorp. 312 | | | |
| need-to-learn 313 | | | |
| need-to-practice 314 | | | |
| group 315 | | | |

Fig. 3

| Practice sentence 401 | | |
|---|---|---|
| Rule-item 1 Group A Priority: 3 | Rule-item 2 Group A Priority: 1 | Rule-item 4 Group B Priority: -1 |

| Practice sentence 402 | | |
|---|---|---|
| Rule-item 1 Group A Priority: 3 | Rule-item 4 Group B Priority: -1 | Rule-item 5 Group B Priority: -2 |

| Practice sentence 403 | | | |
|---|---|---|---|
| Rule-item 7 Group C Priority: 0 | Rule-item 1 Group A Priority: 3 | Rule-item 2 Group A Priority: 1 | Rule-item 3 Group A Priority: 1 |

| Practice sentence 404 | | |
|---|---|---|
| Rule-item 4 Group B Priority: -1 | Rule-item 5 Group B Priority: -2 | Rule-item 6 Group B Priority: -3 |

| Practice sentence 405 | | |
|---|---|---|
| Rule-item 7 Group C Priority: 0 | Rule-item 8 Group C Priority: 0 | Rule-item 1 Group A Priority: 3 |

Fig. 4

TARGETED REPETITION AND TARGETED REINFORCEMENT IN A LANGUAGE LEARNING SYSTEM

CROSS-REFERENCE TO RELATED APPLICATION

This application claims priority under 35 U.S.C. § 119(e) from U.S. Provisional Patent Application No. 62/031,127, by Geller, "Target Repetition And Targeted Reinforcement In A Language Learning System", filed Jul. 30, 2014, which is incorporated by reference for all purposes

TECHNICAL FIELD

The present invention relates generally to a computerized language teaching system. More particularly, the present invention relates to an adaptive, personalizing system for teaching languages.

BACKGROUND INFORMATION

Human learning requires the introduction of new material alongside old material. A person's ability to self-regulate this process is limited, as it is difficult for a student of languages to estimate the degree of familiarity he has with a single word or grammatical rule in a given set of such words and rules. It is also difficult to determine whether or not enough time has passed since the last exposure to a given word or rule to merit practicing it again.

Some computer-aided language learning methods have employed a concept called 'space repetition' to address the second of the above issues. Alternative names include 'spaced rehearsal', 'expanding rehearsal', 'graduated intervals', 'repetition spacing', 'repetition scheduling', 'spaced retrieval' and 'expanded retrieval'.

Typically, the learned material consists of pairs of two items, where the learner is memorizing the connection between the two items. For instance, a student may be asked to provide the correct translation of a word or sentence into a target language. After the first exposure to this bit of learning material, when it is the time to review the item again the learner is shown one of the two items and is asked to produce or select from a list the connected item. If he does so successfully, the time or 'spacing' until the next repetition will increase. If he fails, the time until the next repetition will decrease.

However, the concept of spaced repetition is only part of the solution needed to regulate learning in an optimal fashion. Learning speed is improved when words and rules are practiced together as parts of a sentence, rather than piecemeal. Language learning via repeated exposure to a word or rule is enhanced if the word or rule is practiced in an authentic context, placing it in a sentence alongside related items and concepts. And, a student's learning is enhanced when he already has familiarity with concepts that are practiced together.

A method that represents a more complete approach to language learning would take into account these methods of enhancing the language learning process. A computer-aided language learning method that employs these enhancements for a more nuanced and targeted implementation of spaced repetition is sought.

SUMMARY

A computer-based language learning system uses targeted repetition to familiarize a student with words and language governing rules. Targeted repetition presents practice-sentences made up of specific words and rules the language learning system has targeted for practice, with the intervals between encounters of targeted words and rules varying based on prior incorrect, correct and partially correct responses to the rule-items.

Words and language rules not yet known to the student are taught prior to being included in a practice-sentence. Targeted reinforcement screens are shown in proximity to practice-sentences, to drill the student on specific aspects of a word or rule in that practice-sentence he previously had trouble with.

The computer-aided language learning system includes database entries of practice-sentences. The practice-sentences are formed of the grouping of database entries of appropriate translatable words and sentence governing rules. Entries for the translatable words and governing rules are referred to as rule-items. Student responses to sentence practice can thus be used to track the student's facility with various aspects of the rule-items in the database, such as word translation, spelling, conjugation, pronunciation and word order within a sentence.

Student learning records for each rule-item track how many times it has been seen, how recently it was seen, how many times it has been responded to correctly, the rule-item's difficulty and a targeted priority weighting based on prior incorrect and partially correct answers, as well as other information used in calculating an up-to-the-moment 'need to practice' rating for the rule-item.

Rule-item learning records also have related records that track each prior response to the rule-item. This allows the nuanced language learning system to determine the aspects of the rule-item of which a student lacks mastery. Thus, in addition to increasing the frequency with which a student is presented with practice-sentences containing a rule-item he has previously had trouble with, the nuanced language learning system is able to provided targeted reinforcement by drilling the student on the particular aspect of the rule-item needing practice, in proximity to a practice-sentence using the rule-item.

Practice-sentences are selected for student translation using an aggregated 'need-to-practice' value based on the need-to-practice ratings of each of the rule-items making up the practice-sentence. Practice-sentences are only shown to the student if they are made up of known rule-items.

If no practice-sentences made up of known rule-items currently need review, the language learning system will teach a new, unknown rule-item to the student and move that rule-item into the category of known and needing practice. Practice-sentences containing that newly-learned rule-item then become eligible for use in targeted repetition.

Because words and rules should be practiced alongside other words that are part of the field of study, the language learning system proceeds by presenting sentences using words and rules the student has seen before. Rule-items previously mishandled by the student are emphasized using targeted reinforcement of the aspect of the rule-item he mishandled.

If no practice-sentences need review, the system uses that opportunity to present a screen teaching a new, unknown rule-item to the student. The student's responses to multiple aspects of the practice-sentence are tracked in a database of learning records, with the result that the targeted repetition intervals for rules and words in the practice-sentence are varied in dynamic ways and targeted reinforcement of language rules occurs where it is most needed.

Other methods and structures are described in the detailed description below. This summary does not purport to define the invention. The invention is defined by the claims.

BRIEF DESCRIPTION OF THE DRAWINGS

FIG. 2 is a table illustrating how a practice-sentence in the language learning system of the invention is organized.

FIG. 3 is a table illustrating how the learning of a rule-item is tracked in the database of the language learning system of the invention.

FIG. 4 is a diagram representing five example practice-sentences that can be selected for presentation to the student by the language learning system of the invention.

DETAILED DESCRIPTION

Figure 1:
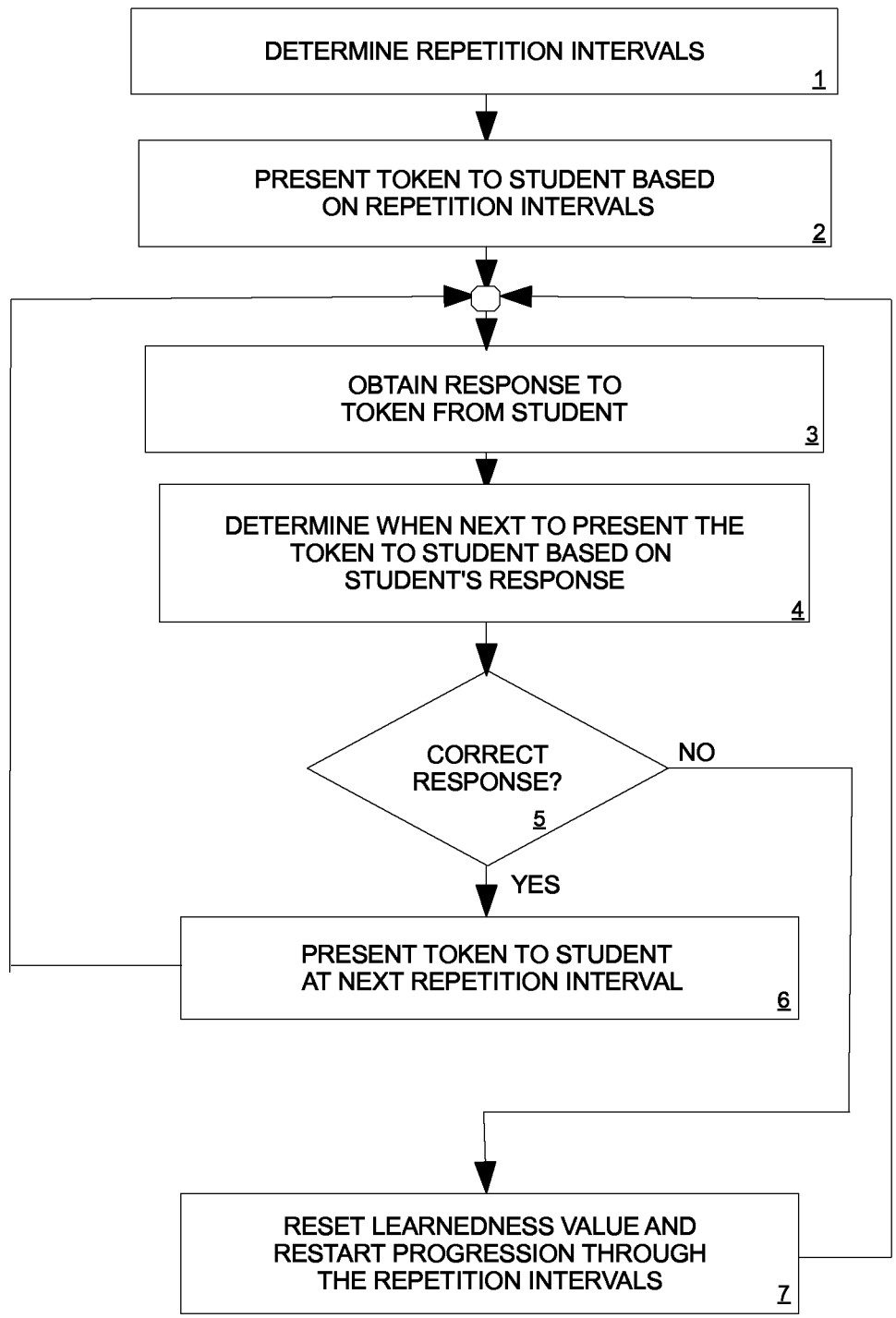
FIG. 1 (PRIOR ART) is a flowchart illustrating the operation of a language learning system using spaced repetition in the prior art.

FIG. 1 (PRIOR ART) is a is a flowchart illustrating the operation of language learning system using spaced repetition in the prior art. In step 1, how large of an interval to leave between repetitions of a language quiz with a binary 'right' or 'wrong' answer is determined. In step 2, a language quiz item or 'token' is presented to a student. In step 3, a response to the token is obtained from a student, and in step 4 the method enters a routine for altering the interval between now and the next presentation of the same token. At step 5, a correct answer by the student flows to step 6, in which the interval is not altered from its current state, and then loops back to the next question. An incorrect answer at step 5 sends the flow to step 7, in which the interval for repeating the question is shortened because it requires practice more frequently.

FIG. 2 is a table illustrating how a practice-sentence in the language learning system of the invention is organized. The top row of the table includes all the rule-items associated with the practice-sentence. These rule-items are the words of the practice-sentence, which are to be translated, and the grammatical rules which govern the practice-sentence as a whole. Each column of the table represents a rule-item and the language rules that the language learning system tracks the student's mastery of.

Here, the example sentence to be translated (into Spanish) is 'I am from Chile'. The rule-items making up the practice-sentence are the words, correctly translated, in fields 201, 202, 203 and 204, along with the relevant governing rules in fields 205, 206 and 207.

For each of the translatable word rule-items, a number of associated fields contain word-aspects that must be learned by the student in order for the student to handle that rule-item correctly in a response to a practice-sentence. An associated word-aspect field can contain the expected translation, as in fields 208, 209, 210 and 211. Other word-aspect fields can determine the correct root word choice, as in fields 212, 213, 214 and 215. Also for each of the word rule-items, a field can determine the spelling of the correct word choice, as in fields 219, 220, 221 and 222. And, word rule-items can have fields 227, 228, 229 and 230 used to determine whether a word was pronounced correctly.

Further, some word rule-items will have other word-aspect fields that a language student can handle correctly or incorrectly. For example, here FIG. 2 illustrates that the word rule-item for the verb 'soy' can have fields for determining whether a student correctly conjugated the verb as to person 224 or tense 225.

Thus, if a student provides the expected translation for such a rule-item, the rule-item is considered to have been handled correctly in that student response. If the student does not provide the expected translation, but the language learning system determines that the student has provided some other word-aspect of the rule-item, such as the correct conjugation or root word choice, then the rule-item is assessed to have been handled partially correctly in that student response. If the language learning system does not identify any word-aspect of that rule-item as having been handled correctly, then the rule-item is considered to have been handled incorrectly in that student response.

Rule-items that contain governing rules rather than words may also be thought of as having fields containing aspects of the governing rule. In the illustrated example, a contextual word choice rule 204 requires that the translation for 'I am' in this practice-sentence uses 'soy' when speaking about country of origin 215. Field 222, holding that the verb 'estoy' is not used in this context, indicates a particular mistake a student might make that the language learning system might expect, and thus be able to track and respond to.

Similarly, the governing rule-item for word order 207 may have a field governing the order of the negation in respect to the verb 218 and a field governing the order of the pronoun in respect to the object 224. The governing rule-item for capitalization 206 might only have only one aspect to determine 217.

FIG. 3 is a table illustrating how the learning of a rule-item is tracked in the database of the language learning system of the invention. The illustrated numbered rule-item entry 301 for a first person singular use of "going" is shown with its associated learning data in the first column.

First, an entry 302 in the column identifies the rule-item as a word to be translated, rather than a sentence structure rule. The next entry 303 in the column indicates the word to be translated; in this case, the English word "going". The next table entry 304 gives the expected first person singular translation.

Next, down the first column are tracked the number of times the rule-item has been seen by this particular student 305, the number of times the student has responded to it correctly 306, and a timestamp 307 for the most recent encounter of this rule-item in a practice-sentence. Next, an entry 308 tracks the ordinal number of the practice-sentence presentation during which this rule-item was last encountered, so that it can be determined how many practice-sentences encounters have happened since the student last saw this rule-item.

The next entry illustrated in the example first column is the targeted priority weighting 309 for the rule-item. The targeted priority weighting is a non-binary error gradation value updated each time the student gives a correct, incorrect or partially correct answer to the rule-item. An incorrect answer results in a large increase to the targeted priority weighting for the rule-item. A partially correct answer results in a smaller increase, and a correct answer reduces the targeted priority weighting, or leaves it unchanged. Partially correct answers can give different increases to the value based on which aspect of the rule-item the student addressed incorrectly.

Next down the column, a numerical rating of the expected difficulty of the rule-item is indicated 310. The system predicts the difficulty a user will have learning the rule-item, compared to other items. The difficulty of the rule-item can be predicted using several factors, including:

The length of the item. Longer words and more complicated rules are more difficult.

The similarity of words (with identical meanings) between the user's base language (their native tongue) and the target language. The degree of similarity can be measured by calculating the number of letters to add, remove or replace to get from one word to the other. This is known as the edit distance. If the two languages do not share an alphabet, edit distance is calculated by first converting the words into their phonetic representation and then calculating the edit distance between these representations.

For example, the word "universidad" in Spanish means "university", so for a user learning Spanish who already knows English, the distance between the units is small and the difficulty can be inferred to be small as well. The distance between the word "oido" and the word "ear" can be said to be greater and therefore more difficult.

Also, each rule-item has a value for its importance to the field of study 311 and ease of incorporation 312 into a practice-sentence. These two values and the expected difficulty 310 are used in choosing a not-yet-known rule-item to present to a student.

Rule-items are given a high importance to the field of study 311 value if they appear frequently in the language. In more particular cases, if the user is focusing on a sub-area of the language, such as "talking about sports" or "talking about cooking", then the sub-set of words that are of high frequency in that sub-area are given greater relevance value in a field associated with that sub-area.

Ease of incorporation 312 is determined by the length of the path to including the rule-item in a practice-sentence meeting the selection criteria. That is, the system checks how many other, additional unknown rule-items it will need to teach to the student before it can select and present a practice-sentence which includes this particular rule-item. The fewer other rule-items needing to be taught before the rule-item can be shown as part of a practice-sentence, the higher the ease of incorporation value.

Difficulty, importance to the subject of study and ease of incorporation into a practice-sentence are then used to determine a 'need-to-learn' value 313 that is used in selecting a new, unknown rule-item to present to a student.

For every rule-item, then, the system is able to calculate a current need-to-practice 314. This measurement uses the above described fields to account for:

The number of times the rule-item has been seen.

The number of times the rule-item has been responded to correctly.

The targeted priority weighting, based on the types of responses the student gave when he previously encountered the item.

The number of practice-sentences the student has worked since the rule-item was last seen.

The current time and chronological distance from the last time the rule-item was seen.

Thus, revising the targeted priority value of the rule-item due to student handling of the rule-item in a student response, also revises the need-to-practice of the rule-item. This measurement results in a positive or negative need-to-practice number, where 0 is the cut-off point for whether a rule-item needs to be practiced or does not need to be practiced. Positive numbers indicate the rule-item has high need and is overdue for practice; negative numbers mean it is too early to practice this item again. In some embodiments, this scale can be reversed (where negative numbers denote a greater need to practice). Priority numbers can be aggregated where multiple rule-items make up a practice-sentence and the language learning system uses this aggregated priority when deciding which practice-sentence to present to the student.

Finally, field 315 indicates whether the rule-item is currently sorted into Group A, B or C, as is explained below in regard to FIG. 4. Note that sort group 314 and current need-to-practice 313 for the rule-item are, in the preferred embodiment, determined on the fly, and are only shown here as part of a rule-item database entry for illustrative purposes.

Columns 316, 317 and 318 illustrate example language learning database table entries tracking the student's previous attempts at the rule-item. The language learning system tracks not just whether these previous attempts were right or wrong, but how the student performed on particular aspects of the rule-item. In the case of the illustrated example, table entries associated with the word rule-item track word-aspects as to whether the student translated the rule-item using the correct root word 319, whether that word was spelled correctly 320, whether the student correctly conjugated the verb in first person singular 321, and whether the correct tense was used 322. Further table entries for each previous attempt can also track the pronunciation of an audio recording 323, when the attempt was made by time-stamp 324 and by ordinal number 325.

FIG. 4 is a diagram representing five example practice-sentences that can be selected for presentation to the student by the language learning system of the invention. Each of the five example practice-sentences is composed of rule-items. Each rule-item has a negative or positive need-to-practice value.

Each rule-item is also sorted into one of three groups. Group A rule-items are known and in need of practice, meaning the student has been presented with this word or rule at least once before by the language learning system, and the need-to-practice of the rule-item is greater than zero. Such rule-items may acquire a positive need-to-practice due to the difficulty of the rule-item, due to the student having given incorrect answers to the rule-item previously, due to a large number of iterations having passed since student has seen the rule-item, or a combination of the above, as discussed earlier in regard to FIG. 3.

Group B rule-items are known but not in need of practice, having acquired a negative need-to-practice due to receiving recent practice or correct responses by the student. Group C rule-items are unknown to the student, having never been presented by the language learning system. Group C rule-items start with a need-to-practice of 0.

When choosing a practice-sentence with which to quiz the student, the language learning system will look for a practice-sentence containing only rule-items that are known and containing at least one rule-item that needs practice. For example, the first example practice-sentence 401 diagram is illustrated as being composed of three rule-items, all known to the student. Two rule-items have positive need-to-practice values, thus needing practice. The three rule-items have need-to-practice values of three, one and negative one, respectively, so the need-to-practice value of the practice-sentence aggregates to three. Of the five illustrated example practice-sentences that can be selected for presentation to the student at this time, this first one one has the highest aggregate need-to-practice, so it would be selected for presentation to the student.

The second illustrated example practice-sentence 402 of FIG. 4 is also available for presentation to the student, as it contains only rule-items that are known and at least one rule-item that needs practice. However, it has an aggregate need-to-practice of zero and, therefore, would not be selected over the first illustrated example practice-sentence.

The third illustrated example practice-sentence 403 of FIG. 4 has, at five, the highest aggregate need-to-practice of all the depicted example practice-sentences. However, it cannot be selected here as a practice-sentence because one of the rule-items it contains, rule-item seven, is not yet known to the student.

The fourth illustrated example practice 404 of FIG. 4 cannot be selected here for presentation to the student because it contains only Group B rule-items. A practice-sentence must contain at least one Group A rule-item to be eligible for practice by the student.

The last illustrated example practice-sentence 405 of FIG. 4 cannot be selected here as a practice-sentence because it contains more than one Group C rule-item, rule-items seven and eight, neither of which is yet known to the student.

Figure 5:
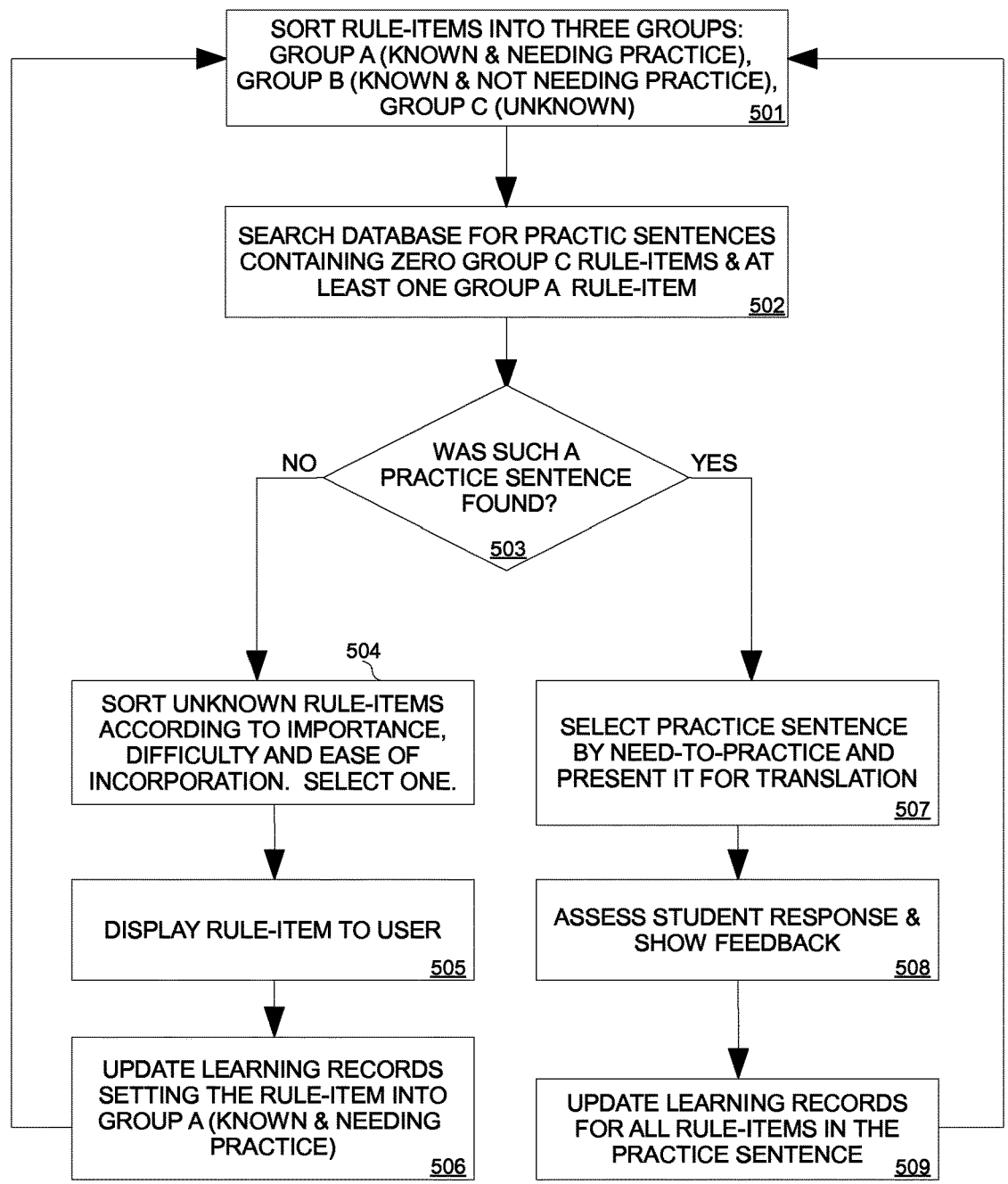
FIG. 5 is a flowchart depicting a process by which the language learning system drills the student on language material using targeted repetition in an embodiment of the invention.

FIG. 5 is a flowchart depicting a process by which the language learning system drills the student on language material in an embodiment of the invention. In the first step 501, the system sorts the rule-items in its database into Group A, Group B and Group C, as explained above in regard to FIG. 4. In the next step 502, the system searches its database for practice-sentences containing no Group C rule-items and at least one Group A rule-item.

If no practice-sentence meeting the criteria for known rule-items needing practice is found 503, the system proceeds to sort 504 unknown (Group C) rule-items by difficulty, importance to the subject of study and ease of incorporation into a practice-sentence. These factors each influence a 'need-to-learn' value for the Group C rule-item.

In the next step 505, one of the unknown rule-items is selected by need-to-learn and presented to the user, accompanied by appropriate explanations and example uses.

In step 506, the learning records for the rule-item, as illustrated in FIG. 3, are updated such that the rule-item is now Group A, known and requiring practice. After a few such iterations, a learning database of unknown rule-items will contain enough Group A rule-items that the system is able to select and present practice-sentences containing known rule-items needing practice in step 507. Practice-sentences that comprise rule-items known and needing practice and no unknown rule-items are considered eligible for presentation to the student.

Thus, in step 503, when at least one practice-sentence is found containing known rule-items needing practice and no unknown (Group C) rule-items, the system selects one of the practice-sentences by aggregate need-to-practice and presents it for student response 507.

The practice-sentence student is typically a sentence in the target language presented as text. The student is expected to respond with a typed translation into a known language. The practice-sentence may also be a sentence in the text of the student's known language, such that the student is expected to respond with a typed translation into the target language.

In other cases, the practice-sentence may be in the form of an audio clip, to which the student is expected to respond with an audio recording. Various combinations of these forms of practice-sentence and expected student response can be used.

In the next step 508, the student response is given an overall assessment and evaluated for accuracy. Each rule-item of the practice-sentence is given a correctness assessment for the student handling it correctly, incorrectly or partially correctly. The evaluation is displayed as feedback to the student.

In the final step 509, the learning records for each rule-item in the practice-sentence are updated. Here, the language system allows for a larger range of possible student responses than correct or incorrect. The student response can also be only partially correct, where he produced an item similar to the correct item but not an exact match. Thus, the learning records for the rule-item can be updated as in FIG. 3, tracking whether the student response was correct as to vocabulary, spelling, verb tense, verb person or pronunciation word-aspects. For different rule-items, the learning records might be updated to note whether the student responded with the correct noun gender, contextual conjunction choice or sentence word order.

Also as in FIG. 3, each rule-item record is updated according to the number of times it has been seen, when, and how many times it has been answered correctly. Partially correct answers are given different targeted priority weightings than entirely correct answers or entirely incorrect answers.

Figure 6:
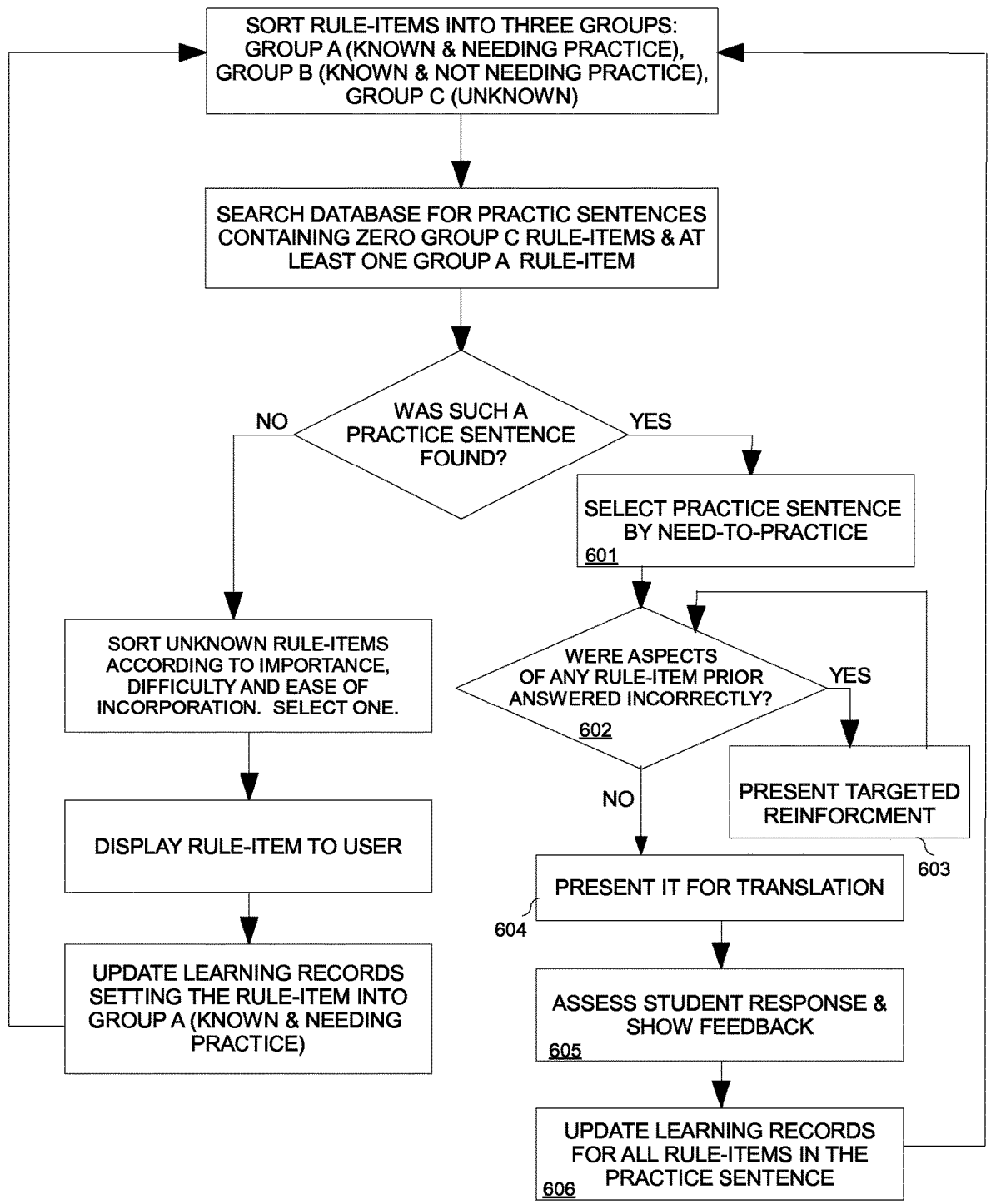
FIG. 6 is a flowchart depicting a process by which the language learning system drills the student on language material using targeted repetition with recursive targeted reinforcement in an embodiment of the invention.

FIG. 6 is an extension of the flowchart of FIG. 5 that illustrates an embodiment using targeted reinforcement to deal with multiple rule-items by looping through each of the rule-items needing practice. The steps of the flowchart are the same as in FIG. 5 up to step 601.

In step 602, after a practice-sentence has been selected by aggregate need-to-practice in step 601, the system checks the learning records to determine which aspects of a rule-item were formed incorrectly in the student's previous encounters with the rule-items and selects one.

In step 603, the student is presented with a targeted reinforcement in a way that targets that aspect of the selected rule-item. For example, if the student previously made a mistake in spelling, the targeted reinforcement will have him re-type the word. If he replaced one with another, the targeted reinforcement will have him choose between two items. If he spoke an item incorrectly, the targeted reinforcement will have him say the item orally while giving constant feedback as to how close he is to the accepted answer. If the student made a contextually incorrect word choice, the targeted reinforcement may give a side-by-side comparison to make the distinction in use and meaning more clear. If the student formed a verb tense incorrectly, the targeted reinforcement may present a drill on forming verb tenses for that type of verb.

After a rule-item targeted reinforcement of step 603 is completed, flow loops back to step 602.

Other rule-items of the selected practice-sentence may at this point be checked for previous incorrect answers, in which case flow loops back to step 603 for a targeted reinforcement on that rule-item. Selection of rule-items may be ordered by need-to-practice, or by order in the sentence. Where the practice-sentence contains only one rule-item needing a targeted reinforcement, only one rule-item targeted reinforcement need be shown. In the preferred embodiment, the rule-item with the highest need-to-practice value is used for targeted reinforcement.

After looping through all targeted reinforcements, flow continues to present the practice-sentence for translation 604, assess student response 605 and update learning records 606, as is explained above in regard to FIG. 5.

Figure 7:
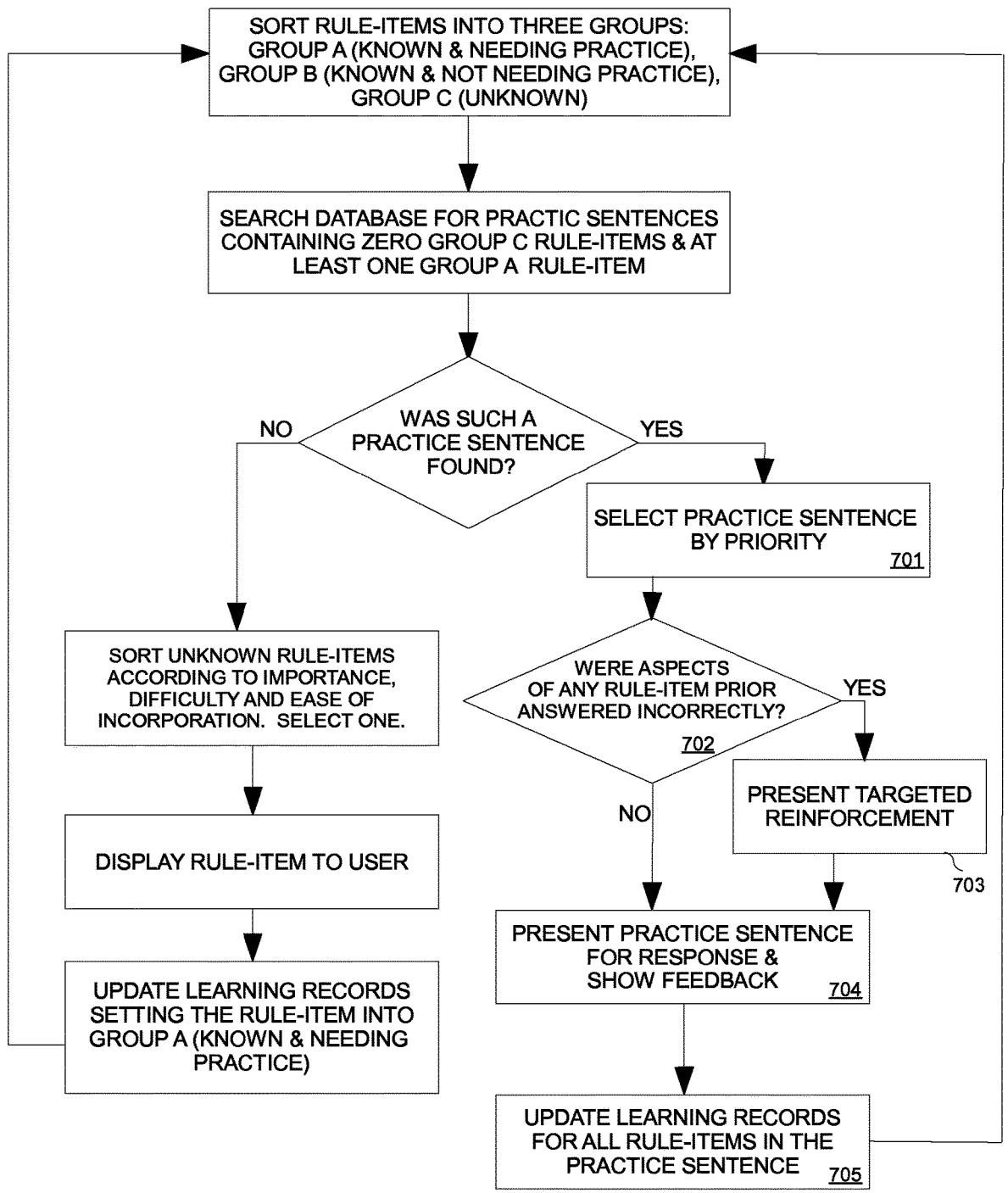
FIG. 7 is a flowchart depicting a process by which the language learning system drills the student on language material using a single isolated practice quiz in an embodiment of the invention.

FIG. 7 is an variant of the flowchart of FIG. 6 that illustrates an embodiment using a single rule-item targeted reinforcement. The steps of the flowchart are the same as in FIG. 5 up to step 701.

In step 702, after a practice-sentence has been selected by aggregate need-to-practice in step 701, the system checks the learning records to determine which aspects of the rule-item most needing were formed incorrectly in the student's previous encounters with the rule-items and selects one. In step 703, the student is presented with an isolated rule-item targeted reinforcement, so that the rule-item can be practiced before being used in the practice-sentence in step 704.

In step 704, the student is presented with all the rule-items together, in the form of the practice-sentence. The student response is evaluated for accuracy and feedback, as in FIG. 5. Learning records for the rule-items are updated 705 and flow loops back to the start, as in FIG. 5.

Figure 8:
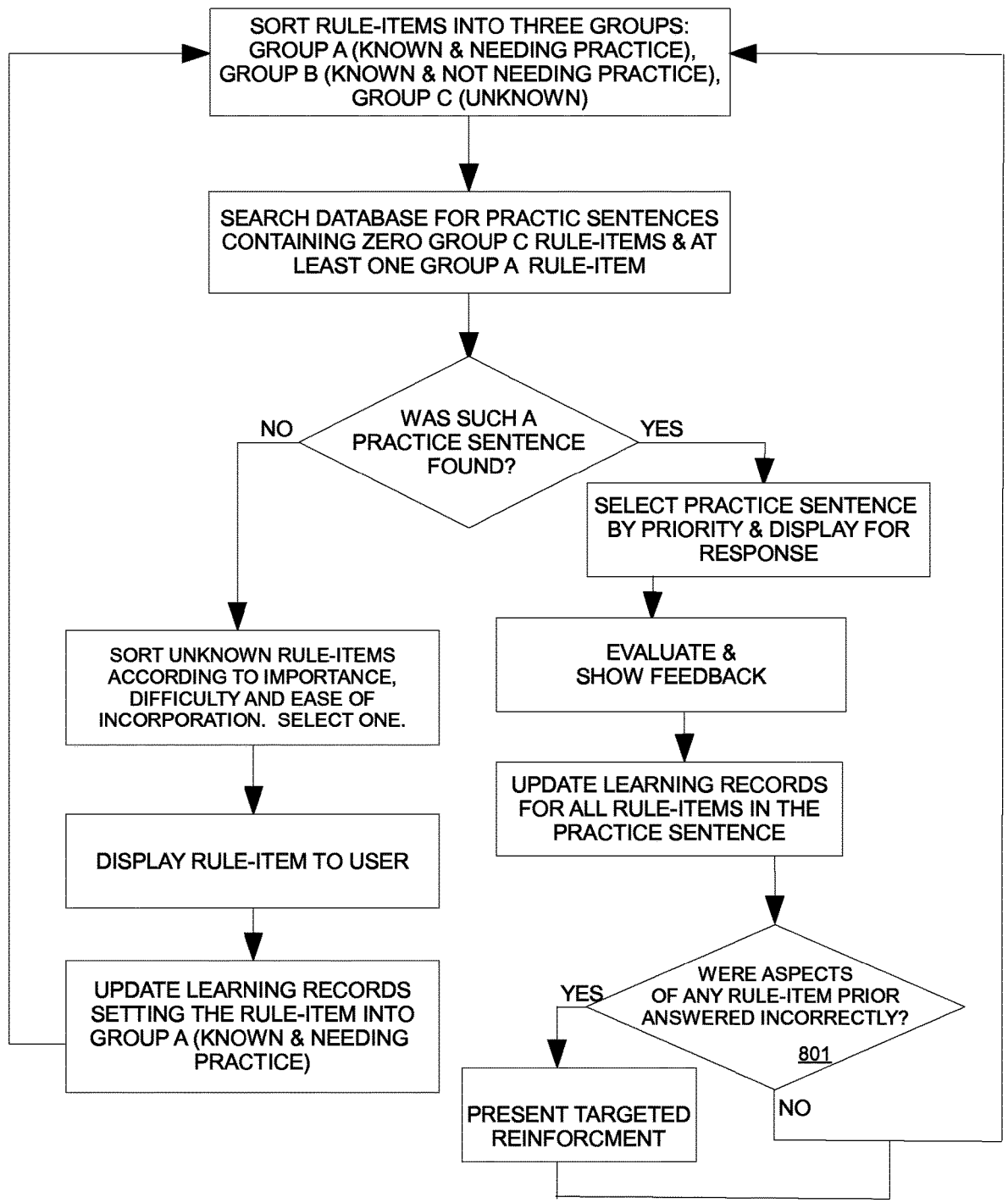
FIG. 8 is a flowchart depicting a process by which the language learning system drills the student on language material using an isolated practice quiz, following a practice-sentence, in an embodiment of the invention.

FIG. 8 is also a flowchart illustrating an embodiment that is a variant of the embodiment illustrated in FIG. 7. In step 801, a maximum of one rule-item targeted reinforcement is presented to the student after encountering it in a practice-sentence, rather than before.

Figure 9:
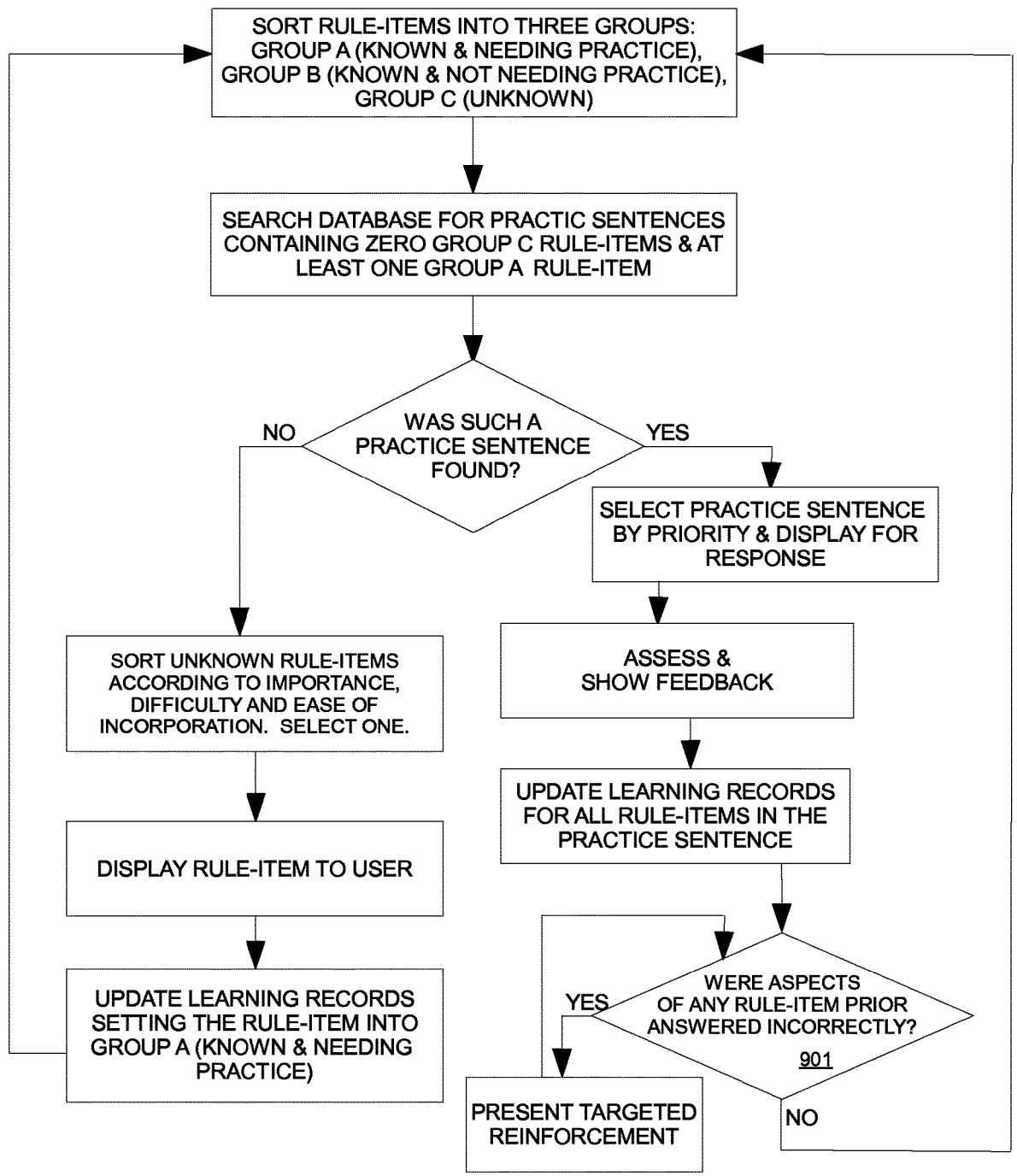
FIG. 9 is a flowchart depicting a process by which the language learning system drills the student on language material recursively using isolated practice quizzes, following a practice-sentence, in an embodiment of the invention.

Finally, FIG. 9 is also a flowchart illustrating an embodiment that is a variant of the embodiment illustrated in FIG. 8. In this embodiment, incorrectly answered rule-items are addressed recursively by targeted reinforcement in step 901 shortly after responding to a practice-sentence, rather than on the next encounter with those rule-items.

OTHER ASPECTS OF THE INVENTION

In another aspect of the invention, mathematical practice-problems, such as equations and word problems, rather than practice-sentences, can be presented according to the system of the invention. In such uses, a mathematical practice-problem may be made up of numerals, mathematical operator rule-items and mathematical governing rule-items such as "multiplication is performed before addition" or other order-of-operations rule-items. Mathematical practice-problems can then be presented such that mistaken responses are evaluated as to which mathematical rule-items the student used incorrectly, and so that targeted priority weighting and rule-item targeted reinforcement can be used to address those mathematical rule-items. The mathematical practice-problem is thus presented for a typed student solution rather than a translation.

In another aspect of the invention, targeted priority weighting can be given not only to the particular rule-item that was addressed incorrectly in a practice-sentence, but also to grammatically similar rule-items. For instance, two rule-items may be considered grammatically similar for the purposes of the invention if they are verbs in which the future tense is formed the same or similar way. If a student makes a mistake forming the future tense of one such verb in a practice-sentence, other rule-items wherein the future tense is formed in a same or similar way can also be targeted with increased priority weighting. In the preferred embodiment, the targeted priority weighting of a related rule-item is increased by a lesser amount than the the targeted priority weighting of the current rule-item is increased.

Note that the described embodiments are not the only possible presentations of the language learning system. Also note that any database-type tables depicted are for illustrative purposes, and do not purport to accurately depict actual database tables used by the system of the invention. In some embodiments, the tables and fields of the learning records are different; for instance, sorting of rule-items into Groups A, B and C may be stored in a database field, rather than done on the fly. Similarly, a need-to-practice or an aggregate need-to-practice value may be stored in a database field or calculated on the fly.

In some embodiments, the difficulty or importance of a rule-item may factor into the need-to-practice calculation.

The indicated student responses are not necessarily limited to typing or recorded speech; other inputs, such as OCR or writing stylus are contemplated.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A computerized system for personalizing language learning to a particular student, comprising
   a standard general-purpose computer necessarily having a processor and a non-transitory memory storing a number of language-teaching databases and program instructions for performing the steps of:
   setting need-to-practice values for each of a set of language rule-items, each language rule-item in the set having a set of associated learning records, wherein at least one of said learning records holds a need-to-practice value;
   designating each of said language rule-items as one of:
   known to the student and requiring practice,
   known to the student and not requiring practice, or
   unknown to the student;
   selecting an eligible set of practice-sentences such that each practice-sentence of the eligible set comprises:
   at least one language rule-item designated as known to the student and requiring practice,
   no language rule-items designated as unknown to the student, and
   any number of language rule-items designated as known to the student and not requiring practice;
   selecting a practice-sentence from said eligible set based on the need-to-practice values of the language rule-items in the practice-sentence;
   displaying the selected practice-sentence for student response;
   receiving a student response to the displayed practice-sentence;
   assessing said student response; and,
   updating the learning records for each language rule-item in the displayed practice-sentence.

2. The computerized system of claim 1, wherein each of said language rule-items has an associated targeted priority value, said targeted priority value being a factor that influences the need-to-practice value of its associated language rule-item, further comprising the steps of:
   designating said assessed language rule-item as either correctly addressed, incorrectly addressed or partially incorrectly addressed; and,
   revising the targeted priority value of said assessed language rule-item,
      such that the targeted priority value for an incorrectly addressed language rule-item is revised higher by a first increase amount,
      such that the targeted priority value for a language rule-item addressed partially incorrectly is revised higher by a second increase amount that is less than said first increase amount, and
      such that the targeted priority value for a correctly addressed language rule-item is either revised lower by a first decrease amount or, else, not changed.

3. The computerized system of claim 1 wherein said need-to-practice value for a given rule-item is influenced by at least one of:
   the number of times the rule-item has been seen,
   how recently the rule-item has been seen and
   how many practice-sentences the student has seen since he last saw the rule-item;
and wherein said need-to-practice value for the given rule-item is influenced by at least one of:
   rule-item difficulty,
   importance of rule-item to subject of study,
   ease of incorporation into a practice-sentence,
   number of times the rule-item has been seen by the particular student,
   number of times the rule-item has been responded to correctly by the particular student,
   targeted priority weighting,
   number of practice-sentences worked by the particular student since last seeing the rule-item
   time since the particular student has last seen the rule-item.

4. The computerized system of claim 1, wherein at least one translatable word rule-item of the selected practice sentence has at least one associated word-aspect field;
   wherein an associated word-aspect field for the translatable word rule-item is taken from the list comprising:
      translation,
      root word,
      spelling,
      pronunciation,
      conjugation as to person,
      conjugation as to tense,
      contextual word choice,
      pluralization, and
      capitalization;
   and, wherein at least one associated student learning record tracks the student's prior handling of said associated word-aspect field.

5. The computerized system of claim 1, wherein at least one translatable word rule-item of the selected practice-sentence has at least one associated word-aspect field;
   wherein at least one associated student learning record tracks the student's prior handling of said associated word-aspect field; and,
   further comprising the step of:
      presenting a rule-item targeted reinforcement based on said student learning record tracking the student's prior handling of an associated word-aspect.

6. The computerized system of claim 1,
   wherein said rule-items are mathematical rule-items,
   wherein said set of mathematical rule-items comprises operators and mathematical rules,
   wherein said practice-sentence is a mathematical practice problem, and
   wherein said student response is a student solution to a mathematical practice problem.

7. A computer-based language-learning system for personalizing language learning to a given student comprising a computer programmed to perform the steps of:
   setting need-to-practice values for each of a set of language rule-items stored in a database in the computer, each language rule-item in the set having a set of associated stored database learning records, wherein at least one of said learning records holds a need-to-practice value;
      wherein said need-to-practice value for a given rule-item is influenced by at least one of:
      the number of times the rule-item has been seen,
      how recently the rule-item has been seen and
      how many practice-sentences the student has seen since he last saw the rule-item;
      and wherein said need-to-practice value for the given rule-item is influenced by at least one of:
      rule-item difficulty,
      importance of rule-item to subject of study,
      ease of incorporation into a practice-sentence,
      number of times the rule-item has been seen by the particular student,
      number of times the rule-item has been responded to correctly by the particular student,
      targeted priority weighting,
      number of practice-sentences worked by the particular student since last seeing the rule-item, and
      time since the particular student has last seen the rule-item;
   designating each of said language rule-items as one of:
      known to the student and requiring practice,
      known to the student and not requiring practice, or
      unknown to the student;
   selecting an eligible set of practice-sentences such that each practice-sentence of the eligible set comprises:
      at least one language rule-item designated as known to the student and requiring practice,
      no language rule-items designated as unknown to the student, and
      any number of language rule-items designated as known to the student and not requiring practice;
   calculating the need-to-practice value of each practice-sentence in said eligible set of practice-sentences;
   displaying a selected practice-sentence for student response;
   receiving a student response to the displayed practice-sentence, the student response having been sent to the computer of the computer-based language-learning system via a device capable of outputting electronic responses readable by the computer of the computer-based language-learning system, said device being one of: a computer keyboard, an optical-character recognition device, an audio recording device and a computer stylus;
   assessing said student response; and,
   updating the learning records for each language rule-item in the displayed practice-sentence.

8. The computer-based language-learning system of claim 7, wherein each of said language rule-items has an associated targeted priority value, said targeted priority value being a factor that influences the need-to-practice value of its associated language rule-item, further comprising the steps of:
  designating said assessed language rule-item as either correctly addressed, incorrectly addressed or partially incorrectly addressed; and,
  revising the targeted priority value of said assessed language rule-item,
    such that the targeted priority value for an incorrectly addressed language rule-item is revised higher by a first increase amount,
    such that the targeted priority value for a language rule-item addressed partially incorrectly is revised higher by a second increase amount that is less than said first increase amount, and
    such that the targeted priority value for a correctly addressed language rule-item is either revised lower by a first decrease amount or, else, not changed.

9. The computer-based language-learning system of claim 7, wherein said need-to-practice value for a given rule-item is influenced by the number of times the rule-item has been seen, by how recently the rule-item has been seen and by how many practice-sentences the student has seen since he last saw the rule-item.

10. The computer-based language-learning system of claim 7, wherein each translatable word rule-item of the selected practice sentence has at least one associated word-aspect field; and,
  wherein the computerized system tracks the student's prior handling of said associated word-aspect fields via associated student learning records.

11. The computer-based language-learning system of claim 7, wherein at least one translatable word rule-item of the selected practice-sentence has at least one associated word-aspect field;
  wherein at least one associated student learning record tracks the student's prior handling of said associated word-aspect field; and,
  further comprising the step of:
    presenting a rule-item targeted reinforcement based on said student learning record tracking the student's prior handling of an associated word-aspect.

12. The computer-based language-learning system of claim 7,
  wherein said rule-items are mathematical rule-items,
  wherein said set of mathematical rule-items comprises operators and mathematical rules,
  wherein said practice-sentence is a mathematical practice problem, and
  wherein said student response is a student solution.

13. A computer-based language-learning system for personalizing language learning to a given student,
  the computer-based language-learning system comprising a computer that stores a number of program steps and language-learning databases, said number of language-learning databases comprising:
    a language database, the language database comprising a database set of language-rule items, said database set of language rule-items comprising translatable words and sentence governing rules (each rule-item of the database set of language rule-items being associated with a stored database set of rule-item aspects);
    a practice-sentence database, the practice-sentence database comprising a database set of practice sentences in a particular language, each practice-sentence comprising translatable word rule-items and sentence governing rule-items from said database set of language-rule items;
      wherein at least one translatable word rule-item of a practice sentence has at least one associated word-aspect field;
      wherein an associated word-aspect field for the translatable word rule-item is taken from the list comprising:
        translation,
        root word,
        spelling,
        pronunciation,
        conjugation as to person,
        conjugation as to tense,
        contextual word choice,
        pluralization, and
        capitalization;
    a student learning database, the student learning database comprising a database set of language rule-item learning records, each rule-item learning record storing in memory a need-to-practice value associated with a particular student user and associated with a language rule-item in said database set of language rule-items;
  and, said programs steps comprising:
    setting need-to-practice values for each of the language rule-item learning records in the student learning database;
    performing a database sort of the database set of language rule-items based on the need-to-practice value of each associated rule-item learning record, such that each of said language rule-items is designated:
      known to the student and requiring practice,
      known to the student, but not in need of practice, or,
      unknown to the student;
      presenting a rule-item from the group of unknown rule-items to the student via displaying it on a computer screen, consequentially re-designating said screen-presented rule-item from 'unknown' to 'known to the student and requiring practice;
    selecting an eligible set of practice-sentences such that each practice-sentence of the eligible set comprises:
      at least one language rule-item designated as known to the student and requiring practice,
      no language rule-items designated as unknown to the student, and
      any number of language rule-items designated as known to the student but not in need of practice;
    selecting a practice-sentence from said eligible set based on the need-to-practice values of the language rule-items in the practice-sentence;
    sending the selected practice-sentence for display to the student on said computer screen;
    receiving a student response to the displayed practice-sentence, the student response being sent to the computer of the computer-based language-learning system via a device capable of sending electronic responses to the computer of the computer-based language-learning system, said device being one of:
      a computer keyboard, an optical-character recognition device, an audio recording device or a computer stylus;
    assessing said student response;
    updating the learning records for each language rule-item in the displayed practice-sentence;

calculating the need-to-practice values for each rule-item learning record; and, sending a targeted-reinforcement exercise for display to the student on said computer screen.

14. The computer-based language-learning system of claim 13, wherein each of said language rule-items has an associated targeted priority value, said targeted priority value being a factor that influences the need-to-practice value of its associated language rule-item, said program steps further comprising the steps of:

designating said assessed language rule-item as either correctly addressed, incorrectly addressed or partially incorrectly addressed; and, revising the targeted priority value of said assessed language rule-item, such that the targeted priority value for an incorrectly addressed language rule-item is revised higher by a first increase amount, such that the targeted priority value for a language rule-item addressed partially incorrectly is revised higher by a second increase amount that is less than said first increase amount, and such that the targeted priority value for a correctly addressed language rule-item is either revised lower by a first decrease amount or, else, not changed.

15. The computer-based language-learning system of claim 13 wherein said need-to-practice value for a given rule-item is influenced by the number of times the rule-item has been seen, by how recently the rule-item has been seen and by how many practice-sentences the student has seen since he last saw the rule-item.

16. The computer-based language-learning system of claim 13, wherein at least one translatable word rule-item of the selected practice-sentence has at least one associated word-aspect field;

wherein at least one associated student learning record tracks the student's prior handling of said associated word-aspect field.

17. The computer-based language-learning system of claim 13, wherein at least one translatable word rule-item of the selected practice-sentence has at least one associated word-aspect field;

wherein at least one associated student learning record tracks the student's prior handling of said associated word-aspect field; and, further comprising the step of:

presenting a rule-item targeted reinforcement based on said student learning record tracking the student's prior handling of an associated word-aspect.

18. The computer-based language-learning system of claim 13, wherein said rule-items are mathematical rule-items, wherein said set of mathematical rule-items comprises operators and mathematical rules, wherein said practice-sentence is a mathematical practice problem, and wherein said student response is a student mathematical practice problem solution.

* * * * *